United States Patent
Barraclough et al.

(10) Patent No.: US 7,124,165 B1
(45) Date of Patent: *Oct. 17, 2006

(54) ARRANGEMENT AND METHOD FOR DISPLAYING AND SHARING IMAGES

(75) Inventors: Keith Barraclough, Menlo Park, CA (US); Michael Noonen, San Jose, CA (US)

(73) Assignee: 8x8, Inc., Santa Clara, CA (US)

( * ) Notice: Subject to any disclaimer, the term of this patent is extended or adjusted under 35 U.S.C. 154(b) by 774 days.

This patent is subject to a terminal disclaimer.

(21) Appl. No.: 09/923,084

(22) Filed: Aug. 6, 2001

Related U.S. Application Data

(63) Continuation of application No. 09/181,140, filed on Oct. 27, 1998, now Pat. No. 6,301,607.

(60) Provisional application No. 60/075,858, filed on Feb. 25, 1998, provisional application No. 60/073,874, filed on Feb. 6, 1998.

(51) Int. Cl.
*G06F 15/16* (2006.01)
*H04N 5/225* (2006.01)

(52) U.S. Cl. ............... 709/204; 709/217; 348/207.1

(58) Field of Classification Search ............ 709/204, 709/205, 227, 228, 203, 206, 232, 249; 345/841, 345/733; 358/487; 379/93.17; 715/501.1
See application file for complete search history.

(56) References Cited

U.S. PATENT DOCUMENTS

| | | | | |
|---|---|---|---|---|
| 5,666,215 A | * | 9/1997 | Fredlund et al. ............ | 358/487 |
| 5,710,883 A | * | 1/1998 | Hong et al. ................. | 709/206 |
| 5,799,219 A | * | 8/1998 | Moghadam et al. ........ | 358/487 |
| 5,862,330 A | * | 1/1999 | Anupam et al. ............ | 709/204 |
| 5,974,446 A | * | 10/1999 | Sonnenreich et al. ....... | 709/203 |
| 6,018,774 A | * | 1/2000 | Mayle et al. ............... | 709/203 |
| 6,025,843 A | * | 2/2000 | Sklar .......................... | 345/841 |
| 6,035,323 A | * | 3/2000 | Narayen et al. ............ | 709/232 |
| 6,058,428 A | * | 5/2000 | Wang et al. ................ | 707/203 |
| 6,085,249 A | * | 7/2000 | Wang et al. ................ | 709/203 |
| 6,167,469 A | * | 12/2000 | Safai et al. ................. | 345/733 |
| 6,192,123 B1 | * | 2/2001 | Grunsted et al. ........ | 379/93.17 |
| 6,202,061 B1 | * | 3/2001 | Khosla et al. ........... | 715/501.1 |
| 6,275,490 B1 | * | 8/2001 | Mattaway et al. ......... | 709/249 |
| 6,295,551 B1 | * | 9/2001 | Roberts et al. ............ | 709/205 |

FOREIGN PATENT DOCUMENTS

| | | | |
|---|---|---|---|
| WO | WO 96/37068 | * | 11/1996 |
| WO | WO 97/48050 | * | 12/1997 |

OTHER PUBLICATIONS

Yuichi Yagawa et al., The Digital Album: A Personal Entertainment System, Proceeding of 3 rd International Conference on Multimedia Computing and Systems, IEEE, Jun. 1996, pp. 433-439.*

(Continued)

*Primary Examiner*—Patrice Winder
(74) *Attorney, Agent, or Firm*—Robert J. Crawford; Crawford Maunu PLLC

(57) ABSTRACT

According to an aspect of the disclosure, the present invention provides methods and arrangements for using the internet and an internet access appliance to share images, wherein the images are captured, downloaded, and sent to a server. At the server, the images are parsed and posted to a web page. Subsequent communication is automatically sent to individuals selected by the sender to notify them of the posting of new images. The present invention provides an effective and efficient manner in which to share images for business, marketing, and home use.

27 Claims, 1 Drawing Sheet

OTHER PUBLICATIONS

Vassilis Athitsos et al., Distinguishing Phtographs and Graphics on the World Wide Web, Proceedings IEEE Workshop on Content-Based Access of Image and Video Libraries, Jun. 1997, pp. 10-17.*

Stefan Schmid, Web Representation of Dynamic Thumbnails, dept of Distributed Systems, University of Ulm, Mar. 1998, 17 pages, [http://www.citeseer.com].*

* cited by examiner

ARRANGEMENT AND METHOD FOR DISPLAYING AND SHARING IMAGES

This is a continuation of U.S. patent application Ser. No. 09/181,140 filed on Oct. 27, 1998 and entitled "Arrangement and Method for Displaying and Sharing Images," now U.S. Pat. No. 6,301,607 B2 to which priority is claimed under 35 U.S.C. §120, and which claims priority to and incorporates by reference Provisional Application Ser. Nos. 60/073,874 (filed on Feb. 6, 1998) and 60/075,858 (filed on Feb. 25, 1998).

FIELD OF THE INVENTION

The present invention relates to image retrieval and image transfer using commercially available communication channels such as POTS (plain old telephone service) lines, and a server system such as the Internet.

BACKGROUND

Devices for video and image capturing have evolved into common and affordable household tools. Such devices include digital cameras and videophones. The advancing technology is continually making such devices cheaper, easier to use, and more versatile.

Another advancing technology, the internet, has evolved into a common household tool used for fast and efficient communication of endless types of information. The methods of communication have been evolving rapidly and are growing in number. The communication of such information includes the display of fixed and video images. These images have been used both privately and commercially for purposes such as image sharing. Applications include the posting of images to a web page or BBS, and direct electronic delivery of the images to selected recipients.

Notwithstanding the existence of the foregoing advancements, endeavors such as photo developing businesses and real estate businesses have not yet realized the advantages, including the use of rapid image transfer, associated with these advancing technologies. Photo developing businesses continue to use archaic communication methods to submit photos to be processed, such as hand delivery or conventional mail. In addition, the sharing of images for selection for photo processing, such as between family members and friends, continues to be carried out through outdated methods, such as by the physical sharing or mailing of such images.

Real estate businesses also continue to use archaic communication methods. Physical presence at a real estate site and hand delivery of real estate pictures or videos to potential purchasers are common. Such photos or videos are not interactive, meaning the potential purchasers must search elsewhere, contact the realtor via other means, or travel to the real estate site in order to obtain further information. In addition, realtors continue to use manual communication to reach potential purchasers, such as by conventional newspaper advertisements, phone calls, or physical visits.

SUMMARY

The present invention is directed to a method of sharing and displaying images using an internet access appliance with internet telephony and image capture capability for commercial and non-commercial use.

According to an example embodiment, digital images are captured, downloaded to an internet access appliance with internet telephony and image capture capability, or downloaded directly to network storage through the network appliance (that may be transmitted with or without compression), attached to an electronic communication, and sent to a server where the images are parsed and posted onto a web page where they are stored, and subsequent communication is automatically sent to selected individuals. The images may comprise stationary and video images. The selected individuals may comprise family members, friends, target customers, and business associates.

The above summary of the present invention is not intended to describe each illustrated embodiment or every implementation of the present invention. The figures and the detailed description which follow more particularly exemplify these embodiments.

BRIEF DESCRIPTION OF THE DRAWING

Other aspects and advantages of the present invention will become apparent upon reading the following detailed description and upon reference to the drawing in which.

Figure 1:
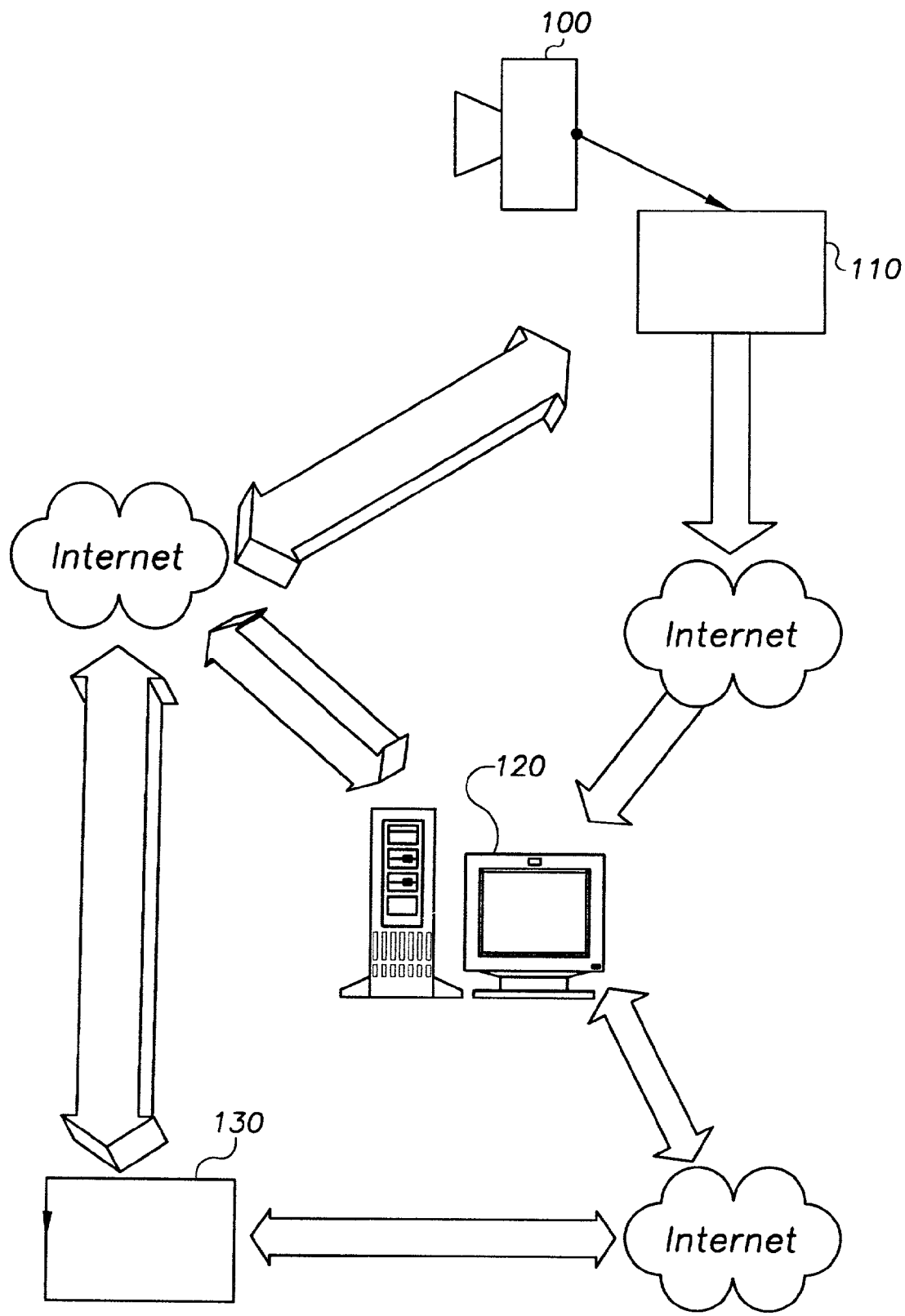
FIG. 1 is a flow diagram representing a method of using the internet to display and share images, according to particular embodiments of the present invention.

While the invention is susceptible to various modifications in alternative forms, specific embodiments thereof have been shown by way of example in the drawing and will herein be described in detail. It should be understood, however, that it is not intended to limit the invention to a particular form disclosed. On the contrary, the invention is to cover all modifications, equivalents, and alternatives falling within the spirit and scope of the invention as defined by the appended claims.

DETAILED DESCRIPTION

In the following detailed description, reference is made to the accompanying drawing which forms a part hereof, and in which are shown by way of illustration specific embodiments in which the invention may be practiced. It is to be understood that other embodiments may be utilized and structural changes may be made without departing from the scope of the present invention.

According to an example embodiment, FIG. 1 shows a flow diagram of a system for displaying and sharing images using an internet access appliance with internet telephony and video capture capability. Images are captured with a digital camera or camcorder 100 and downloaded to an internet access appliance 110 with image capture capability. The images are attached to a first electronic communication and sent to a web server 120 via the internet. At the web server 120, the images are parsed and posted to a web page on the internet. The images may comprise stationary and video images.

A second electronic communication is automatically sent from the web server 120 to individuals, selected by the sender of the first electronic communication, via the internet, notifying the individuals of the new posting on the web page. The selected individuals may comprise family members, friends, target customers, and business associates. The individuals visit the web page via the internet to view the new images using an internet access appliance with image capture capability 130. The automatic delivery of the second electronic communication provides a highly efficient manner in which the sender of the first electronic communication can communicate with the selected individuals.

Information such as the sender's IP address, email address, web site address, or telephone number may be imbedded into, associated with or attached to the images posted on the web page. This information provides an easy way for the selected individuals to return a communication efficiently to the sender. Also, information such as descriptions, prices, and ordering details may accompany the images posted on the web page. This accompanying information may be used to describe the images, or list prices of goods for sale, or provide information such as availability, delivery costs, or other ordering information.

Selected individuals may visit the web page via the internet to view the new images using an internet access appliance 130, as in FIG. 1. An individual may click on a posted image with information that is imbedded, associated or attached, thereby initiating an internet phone call to the sender. The sender receives the call and a conference call is held while simultaneously accessing the images on the web page, using the internet access appliance 130.

In addition, an individual may click on a posted image with information that is imbedded, associated or attached, thereby initiating an internet phone call to the sender. The sender receives the call and a conference call is held while simultaneously accessing the images on the web page, using the internet access appliance 130, wherein the web page is interactive, such that the images can be altered or exchanged by one of the users, and wherein the alterations or exchanges are viewed by all users holding the conference call and simultaneously accessing the web page.

Furthermore, an individual may click on a posted image, thereby initiating an electronic communication to the sender, initiating access to another web page, or generating a facsimile.

The present invention greatly enhances communication abilities. For example, the use of this method in the operation of a real estate business broadens the abilities of realtors to communicate with customers, and provides a more cost effective way to do so. For instance, in an example embodiment of the present invention, a realtor can capture video images of real estate property, download them to an internet access appliance 110, as in FIG. 1, and send them to the server 120 where they are posted to a web site. Subsequent electronic communication is automatically sent to potential buyers of the real estate, as selected by the realtor, to inform them of the new posting. The potential buyers can then access the web site, using an internet access appliance 130, and view the real estate video images. Information may be imbedded into the video images, allowing the potential buyers to click on the images and initiate communication with the realtor. The communication may be in the form of an internet phone call, wherein the realtor answers the call and discusses the real estate with the potential buyer.

Furthermore, the realtor and the potential buyer may simultaneously access the web site, wherein the realtor may alter the images in order to demonstrate certain aspects of the real estate, or the realtor may exchange the images on the site to show alternate images to the potential buyer. Additionally, the realtor may be present at the location of the real estate, and may use an internet access appliance with video capture and telephony capability 110 to capture further images of the real estate while holding an internet phone call with the potential buyer, and may download those video images and send them to the server 120, where they are posted to the web site, and wherein the potential buyers can instantaneously view the newly posted images.

The present invention provides real-time, or nearly real-time, viewing of the real estate by the potential buyer, and allows the realtor to respond to the potential buyer's requests for images. For instance, the potential buyer could direct the realtor to capture images of certain parts of the real estate, such as asking to see a master bedroom in a house.

According to another example application, in the operation of a photo developing business, digital images are downloaded to the internet access appliance 110 and sent to the server 120 where they are parsed and posted to a web page, and subsequent communication is automatically sent to selected individuals, wherein the images are digital photographs, and the selected individuals are friends and family of the sender, and wherein the web page contains photo development ordering information, and wherein the images are developed into physical photographs as directed by the sender and the sender's friends and family as indicated on the web page with photo development ordering information.

For use in the operation of a photo and video developing businesses, according to an example embodiment of the present invention, as in FIG. 1, digital photographs and videos of an event, such as a religious gathering or a wedding, may be downloaded to the internet access appliance 110 and sent to the server 120 where they are parsed and posted to a web site, and wherein subsequent communication is automatically sent to individuals, such as relatives and friends of those present at the event. For instance, a wedding couple and their relatives and friends can then access the web site, view the wedding photograph and video images, and select those photos or videos that they wish to have developed and delivered to them by making selections while accessing the web site.

For further use in the operation of a photo and video developing businesses, according to another example embodiment of the present invention, as in FIG. 1, digital photographs and videos of a family gathering, such as a birthday or reunion, or digital photographs and videos of family members, may be downloaded to the internet access appliance 110 and sent to the server 120. A subsequent electronic communication may be sent to family members. The family members can then access the web site using the internet access appliance 130, view the images, and select those photos or videos that they wish to have developed and delivered to them by making selections while accessing the web site. This example embodiment of the present invention would be particularly useful for friends and family members who do not live near each other, yet wish to stay close to their friends and family, such as for grandparents who want to see their grandchildren grow up.

According to another example application, in the operation of a digital photograph processing business, digital images are downloaded to the internet access appliance 110 and sent to the server 120 where they are parsed, modified, and posted to a web page, and subsequent communication is automatically sent to selected individuals, wherein the images are digital photographs, and the selected individuals are friends and family of the sender, wherein the web page contains digital photo ordering information, and wherein the images are modified as directed by the sender and the sender's friends and family as indicated on the web page digital photo ordering information.

According to a further example embodiment of the present invention, the internet access appliance includes the use of the VC55 Set Top manufactured by 8×8, Inc., 3151 Jay Street, Santa Clara, Calif.

Although specific embodiments have been illustrated and described herein, it is appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and the equivalents thereof.

What is claimed is:

1. A method for displaying and sharing digital images using an internet access appliance with internet telephony and image capture capability, comprising the steps of:
   capturing digital images of an item being viewed by a sender;
   downloading the digital images to the internet access appliance or directly to network storage through the appliance;
   including the digital images with a first email addressed to a server and sending the first email;
   parsing the first email at the server and posting the images to a storage location where the images are stored;
   selecting at least one set of individuals for whom targeted images are to be sent, each set including at least one individual;
   sending a communication to the at least one selected set of individuals to notify of the posted images; and
   while viewing the item, using the internet access appliance to establish a telephony connection with said at least one individual who converses with the sender and concurrently reviews the posted images.

2. A method, according to claim 1, wherein the images are accompanied by descriptions, and are included with the first email as attachments.

3. A method, according to claim 1, wherein the images are posted onto a web page with information imbedded into them, wherein the selected individuals visit the web page to view the images.

4. A method, according to claim 3, wherein clicking on the images initiates an internet phone call to the sender.

5. A method, according to claim 4, wherein an internet phone conference call is held between the sender and the selected individuals while simultaneously accessing web pages with images.

6. A method, according to claim 3, wherein clicking on the images initiates an email letter to the sender.

7. A method, according to claim 3, wherein clicking on the images initiates access to the sender's internet web page.

8. A method, according to claim 1, wherein the images that are of low to medium resolution can be downloaded for viewing across the internet.

9. A method, according to claim 1, wherein the images that are of high resolution are stored for making professionally-developed reprints.

10. A method, according to claim 1, wherein the sender also uses the internet access appliance for conversing with said at least one individual.

11. A method, according to claim 1, wherein the sets of selected individuals comprise potential purchasers of real estate and wherein the digital images comprise images of real estate property.

12. A method for displaying and sharing digital images using an internet access appliance with telephony and image capture capability, comprising the steps of:
   posting at least one digital image via a server to a web page where the at least one image is made available for viewing, the at least one digital image being a digital image of an item captured by a sender;
   selecting at least one individual for whom the at least one image is to be made accessible for viewing;
   notifying the at least one individual of the at least one image being posted to the web page; and
   while viewing at least one image, using the internet access appliance to establish a telephony connection between said at least one individual and a second individual, where the at least one individual and the second individual concurrently review the at least one image at the web page.

13. The method of claim 12, further comprising:
   prior to posting the at least one digital image via the server to a web page, downloading the at least one digital image to the internet access appliance; and
   sending the at least one digital image to a server.

14. The method of claim 13, wherein downloading the at least one digital image to the internet access appliance includes downloading the at least one digital image directly to a network storage arrangement via the internet access appliance.

15. The method of claim 12, wherein the internet access appliance has internet telephony capability, wherein establishing a telephony connection between said at least one individual and a second individual includes establishing an internet telephony connection between the at least one individual and the second individual.

16. The method of claim 12, further comprising establishing access to the posted at least one digital image to a plurality of individuals, wherein any first one of the plurality of individuals is the selected at least one individual, and wherein any second one of the plurality of individuals is the second individual.

17. The method of claim 12, wherein the second individual is the sender.

18. The method of claim 12, further comprising:
   capturing a digital image with the internet access appliance; and
   wherein posting at least one digital image includes posting the captured image with the internet access appliance.

19. The method of claim 18, wherein capturing a digital image includes using a digital image capturing device of the internet access appliance to capture the digital image.

20. The method of claim 18, wherein capturing a digital image includes capturing digital video.

21. The method of claim 12, wherein posting at least one digital image via a server includes using the internet access appliance to send the digital image to the server.

22. An arrangement for displaying and sharing digital images using an internet access appliance with internet telephony and image capture capability, comprising:
   a means for capturing digital images of an item being viewed by a sender;
   a means for downloading the digital images to the internet access appliance or directly to network storage through the appliance;
   a means for including the digital images with a first email addressed to a server and sending the first email;
   a means for parsing the first email at the server and posting the images to a web page where the images are stored;
   a means for selecting at least one set of individuals for whom targeted images are to be sent, each set including at least one individual;
   a means for sending a communication to the at least one selected set of individuals to notify of the images posted to the web page; and
   a means for, while viewing the item, using the internet access appliance to establish a telephony connection with said at least one individual who converses with the sender and concurrently reviews the posted images.

23. An arrangement for displaying and sharing digital images using an internet access appliance with internet telephony and image capture capability, the arrangement comprising:

means for capturing digital images of an item being viewed by a sender;

means for downloading the digital images to the internet access appliance or directly to network storage through the appliance;

means for including the digital images with a first email addressed to a server and sending the first email;

means for selecting at least one set of individuals for whom targeted images are to be sent, each set including at least one individual;

means for sending a communication to the at least one selected set of individuals to notify of the posted images; and means for using, while viewing the item, the internet access appliance to establish a telephony connection with said at least one individual who converses with the sender and concurrently reviews the posted images.

24. A method for displaying and sharing digital images using a telephony appliance with telephony, image capture and internet access capabilities, the method comprising:

capturing at least one digital image with the telephony appliance;

posting the at least one captured digital image from the telephony appliance to a web page where the image is made available for viewing;

selecting at least one individual for whom the at least one image is to be made accessible for viewing;

notifying the at least one individual of the at least one image being posted to the web page; and while viewing at least one image, using the telephony appliance to establish a telephony connection between an individual at the telephony appliance and another individual, wherein the individual at the telephony appliance and the other individual concurrently review the at least one image at the web page.

25. The method of claim 24, wherein using the telephony appliance to establish a telephony connection between an individual at the telephony appliance and another individual includes establishing a voice conversation between the individual at the telephony appliance the other individual.

26. The method of claim 24, wherein posting the at least one captured digital image from the telephony appliance includes posting the image while using the telephony appliance to engage in a telephony conversation.

27. The method of claim 24, wherein capturing at least one digital image includes capturing video.

* * * * *